(No Model.)
C. TURNER.
WELT GUIDE FOR SEWING MACHINES.
No. 273,915. Patented Mar. 13, 1883.
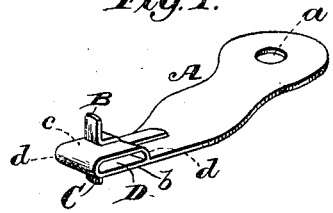
Fig. 1.
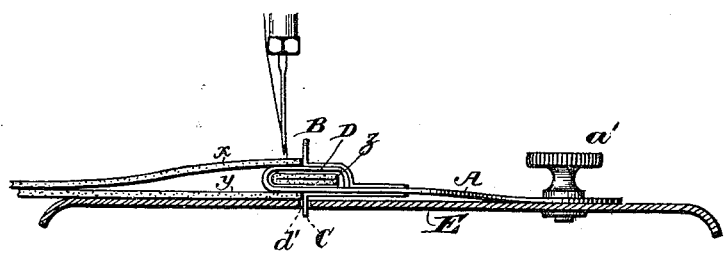
Fig. 2.
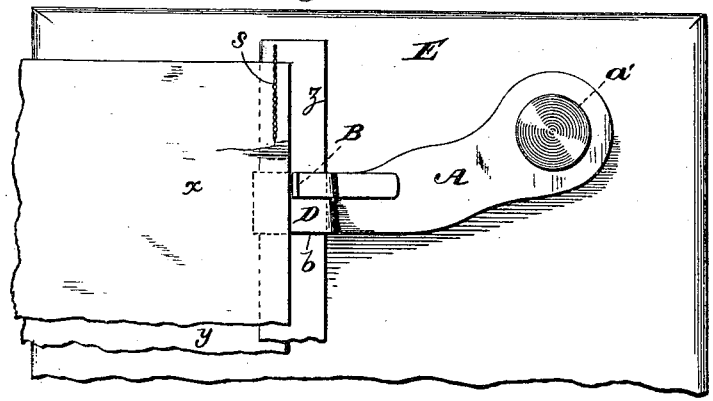
Fig. 3.
Fig. 4.
Witnesses.
Robert Emmett
E. A. Dick
Inventor.
Charles Turner.
By MacMullen Dailey
his Atty.
N. PETERS. Photo-Lithographer, Washington, D. C.

UNITED STATES PATENT OFFICE.

CHARLES TURNER, OF LYNN, ASSIGNOR OF THREE-FOURTHS TO RUFUS S. MERRILL, OF BOSTON, MASSACHUSETTS.

WELT-GUIDE FOR SEWING-MACHINES.

SPECIFICATION forming part of Letters Patent No. 272,915, dated March 13, 1883.

Application filed December 28, 1882. (No model.)

*To all whom it may concern:*

Be it known that I, CHARLES TURNER, of Lynn, Massachusetts, have invented a new and Improved Welt-Guide Attachment for Sewing-Machines, of which the following is a specification.

In the manufacture of certain kinds of goods, and particularly in the manufacture of boots and shoes, it is customary, for the purpose of obtaining ornamental effect as well as enhanced strength, to interpose a welt between two pieces of material to be sewed together at the edges.

My improvement is designed with a view to guide and maintain in position the welt between the two pieces of material to be sewed in such manner as to maintain that edge of the welt which is exposed when the work is turned always in the same position relatively to and at the same distance from the line of stitching by which the parts are bound together. The welt occupies a position intermediate between the two pieces of material, and it is very desirable that its edge, which is inside when the work is turned, should project beyond the edges of the material, both in order to obtain needed strength, to avoid possibility of missing a stitch on the welt by reason of its edge not coming up to the edges of the material, and for other reasons, which need not be stated. To this end I combine with distinct guides for the upper and lower pieces of material, arranged so that a space shall intervene between them for the passage of that part of the welt which projects beyond the edges of the material, a welt-guide consisting of a flattened tube or an equivalent instrumentality which shall guide the welt on both of its edges, said guide being so placed as to hold the welt in a plane between the planes of the upper and lower guides, and also to permit the inner edge of the welt to project the requisite distance between the said upper and lower guides. It is feasible to make the guides for the material separate from the welt-guide; but I prefer to unite them together, so that they may, as one device, be used as a sewing-machine attachment. Inasmuch as the thickness of the material operated on may vary, I arrange the guides so that they may automatically adapt themselves to variations in thickness, for this purpose mounting them upon an elastic or spring bed-plate or arm adapted to be attached at one end to the cloth-plate of the sewing-machine and capable of rising at its free end; and I make the lower guide of a downwardly-extending arm, which enters a slot in the cloth-plate and moves up and down therein, according as the spring-plate rises or falls.

The attachment, in its preferred form, is shown in the accompanying drawings, in which Figure 1 is a perspective view of the device. Fig. 2 is a transverse section of the device together with the sewing-machine cloth-plate to which it is secured, and also the two thicknesses of material and the intermediate welt in place in the guide. Fig. 3 is a plan of the parts shown in Fig. 2. Fig. 4 represents a piece of finished and turned work.

The shape and proportions of the attachment will of course vary according to the requirements of the kind of sewing-machine with which it is to be used. The particular attachment shown in the drawings is intended for a Willcox & Gibbs machine of the kind now in use in Lynn and elsewhere for sewing the uppers, &c., of boots and shoes. In this preferred form of my attachment A is the spring-arm or bed-plate that carries the three guides. It is provided at its rear with a hole, $a$, for the passage of the set-screw $a'$, (see Fig. 2,) which screws into the usual attachment-hole in the cloth-plate E of the sewing-machine and binds the device in place thereon.

B is the upper guide, and C is the lower guide, and D is the intermediate welt-guide. The two guides B C are separated from one another by an intervening space, into which the welt-guide partly extends, the other portion of said welt-guide projecting out in front of the two guides, as seen plainly in Fig. 1. The welt-guide in the present instance is formed by bending over the free end of A upon itself, so as to form a flattened tube upon the upper face of A, which tube is wider at the end $b$, where the welt enters it, than at the opposite end, where the welt leaves it. The flattened tube is formed upon the upper face of A, so that the latter may fit down more readily upon the sewing-machine cloth-plate. It is not necessary that the welt-guide D should be a tube. For instance, its top c might be dispensed with so long as its sides d d, between which the welt passes, are retained. The construction shown, however, is that which in practice has been found to give the best results. The guides B C are formed of thin metallic strips, soldered or otherwise fastened to the upper and under faces of A, respectively, and bent at their outer ends, so as to stand vertically, and thus constitute guide-shoulders against which abut the edges of the two pieces of material between which the welt is inserted. The vertical end of the lower guide, C, enters and works in a slot, $d'$, cut for it at the proper point in the cloth-plate E, as indicated in Fig. 2. The object of this is to permit the bed-plate of the attachment to be as close to the cloth-plate as possible, and yet to furnish a solid and continuous guide to the lower piece of material, whatever may be its thickness. This is illustrated in Fig. 2, where $x$ is the upper piece of material, $y$ is the lower piece of material, and $z$ is the welt. The lower piece, $y$, is of a thickness to raise the outer end of the plate A slightly, with the effect of correspondingly lifting the guide C in the slot $d'$, not far enough, however, to raise the lower end of the guide out of the slot. Were the material thinner the plate A would occupy a lower position and the guide C would correspondingly change position. Thus the attachment automatically adapts itself to variations in thickness of the under piece, $y$.

The attachment in use is set up close to the presser-foot of the sewing-machine in advance of the same relatively to the direction of feed. The welt-guides are so placed relatively to one another and to the needle that when the seam is stitched (the line of stitching is indicated at $s$, Fig. 3) and the work is turned just enough of the welt will project on the turned side of the work to give the seam the requisite corded appearance, as indicated in Fig. 4. By means of this attachment I am enabled to use a folded welt, as indicated. The folded edge, being outmost when the work is turned, requires no further finishing. The device enables an operator to make the seam shown in the drawings with the same ease, facility, and precision as an unwelted seam can be made. All that he has to do is to guide the two pieces $x\ y$ in the ordinary way. The welt is taken care of by the welt-guide automatically and without requiring any manipulation on the part of the operator.

Having described my improvement and the best way known to me of carrying the same into practical effect, what I claim as new and of my own invention is—

1. The combination, with the upper and lower work-guides, of the intermediate tubular welt-guide projecting partly into the space intervening between the work-guides.

2. The spring-yielding upper and lower guides, B C, the latter having a vertical outer end adapted to project into a slot in the cloth-plate, in combination with the intermediate tubular welt-guides, D, under the arrangement and for operation as hereinbefore set forth.

3. The welt-guide attachment for sewing-machines, comprising the spring-arm or bed-plate A, in combination with the upper and lower work-guides, B C, and the intermediate tubular welt-guide, D, projecting partly into the space intervening between the work-guides, arranged for joint operation, as hereinbefore set forth.

In testimony whereof I have hereunto set my hand this 16th day of December, 1882.

CHARLES TURNER.

Witnesses:
GEORGE C. ABBOTT,
J. WALTER BLANDFORD.